United States Patent [19]

Boissonnat et al.

[11] Patent Number: 5,451,355
[45] Date of Patent: Sep. 19, 1995

[54] PROCESS FOR THE MANUFACTURE OF A COMPOSITE THREAD AND COMPOSITE PRODUCTS OBTAINED FROM SAID THREAD

[75] Inventors: Philippe Boissonnat, Barby; Dominique Loubinoux, La Terrasse; Louis Roy, Chambery, all of France

[73] Assignee: Vetrotex France S.A., Chambery, France

[21] Appl. No.: 129,106

[22] Filed: Nov. 30, 1993

[30] Foreign Application Priority Data

Feb. 6, 1992 [FR] France ................. 92 01329

[51] Int. Cl.$^6$ ............................. B29C 67/00
[52] U.S. Cl. ........................... 264/136; 264/280;
264/172.15; 264/172.16; 118/405; 118/420;
156/180; 425/113; 425/114
[58] Field of Search ............. 264/258, 136, 174, 280;
428/375, 377, 373; 156/180, 242; 425/113, 114;
118/405, 420

[56] References Cited

U.S. PATENT DOCUMENTS

| | | | |
|---|---|---|---|
| 2,198,085 | 4/1940 | Le Tourneau et al. | 18/13 |
| 3,467,739 | 9/1969 | Underwood et al. | 264/40 |
| 3,676,095 | 7/1972 | Stalego | 65/3 |
| 3,694,131 | 9/1972 | Stuart | 425/461 |
| 4,406,196 | 9/1983 | Roncato et al. | 83/117 |
| 4,614,678 | 9/1986 | Ganga | 428/74 |
| 4,623,495 | 11/1986 | Degoix et al. | 264/1.5 |
| 4,688,515 | 8/1987 | Rosebrooks | 118/405 |
| 4,713,139 | 12/1987 | Ganga | 156/500 |
| 5,011,523 | 4/1991 | Roncato et al. | 65/2 |

FOREIGN PATENT DOCUMENTS

| | | | |
|---|---|---|---|
| 0033244 | 8/1981 | European Pat. Off. | B29D 3/02 |
| 0218952 | 4/1987 | European Pat. Off. | B29C 47/02 |
| 0393536 | 10/1990 | European Pat. Off. | C08J 5/04 |
| 0456970 | 11/1991 | European Pat. Off. | B29C 47/28 |
| 1024205 | 3/1953 | France. | |
| 1139970 | 11/1962 | Germany. | |
| 1604338 | 12/1981 | United Kingdom | B07B 1/46 |

OTHER PUBLICATIONS

Chang, Yung Yen; *Applied Plastic Molding Tools;* Second Edition, 1980; p. 32.
Patent Abstracts of Japan, vol. 5, No. 131 (M-84)(803), 21 Aug. 1981 & JP, A, 56 67 239 (Furukawa Denki Kogyo), 6 Jun. 1981, see abstract.
Patent Abstracts of Japan, vol. 5, No. 174 (M-96)(846), 10 Nov. 1981 & JP, A, 56 101 839 (Furukawa Denki Kogyo), 14 Aug. 1981, see abstract.
Patent Abstracts of Japan, vol. 6, No. 36 (M-115)(914), 5 Mar. 1982 & JP, A, 56 150 527 (Furukawa Denki Kogyo), 21 Nov. 1981, see abstract.

*Primary Examiner*—James J. Bell
*Attorney, Agent, or Firm*—Pennie & Edmonds

[57] ABSTRACT

The present invention relates to a process for manufacturing a composite thread formed of a plurality of filaments combined with a thermoplastic organic material, which consists in mechanically entraining a thread in a device mounted in the manner of a cross head at the end of an extruder and injecting the material in the direction of the thread and concentrically thereto at a constant maximum radial pressure of less than 50 bars.

18 Claims, 1 Drawing Sheet

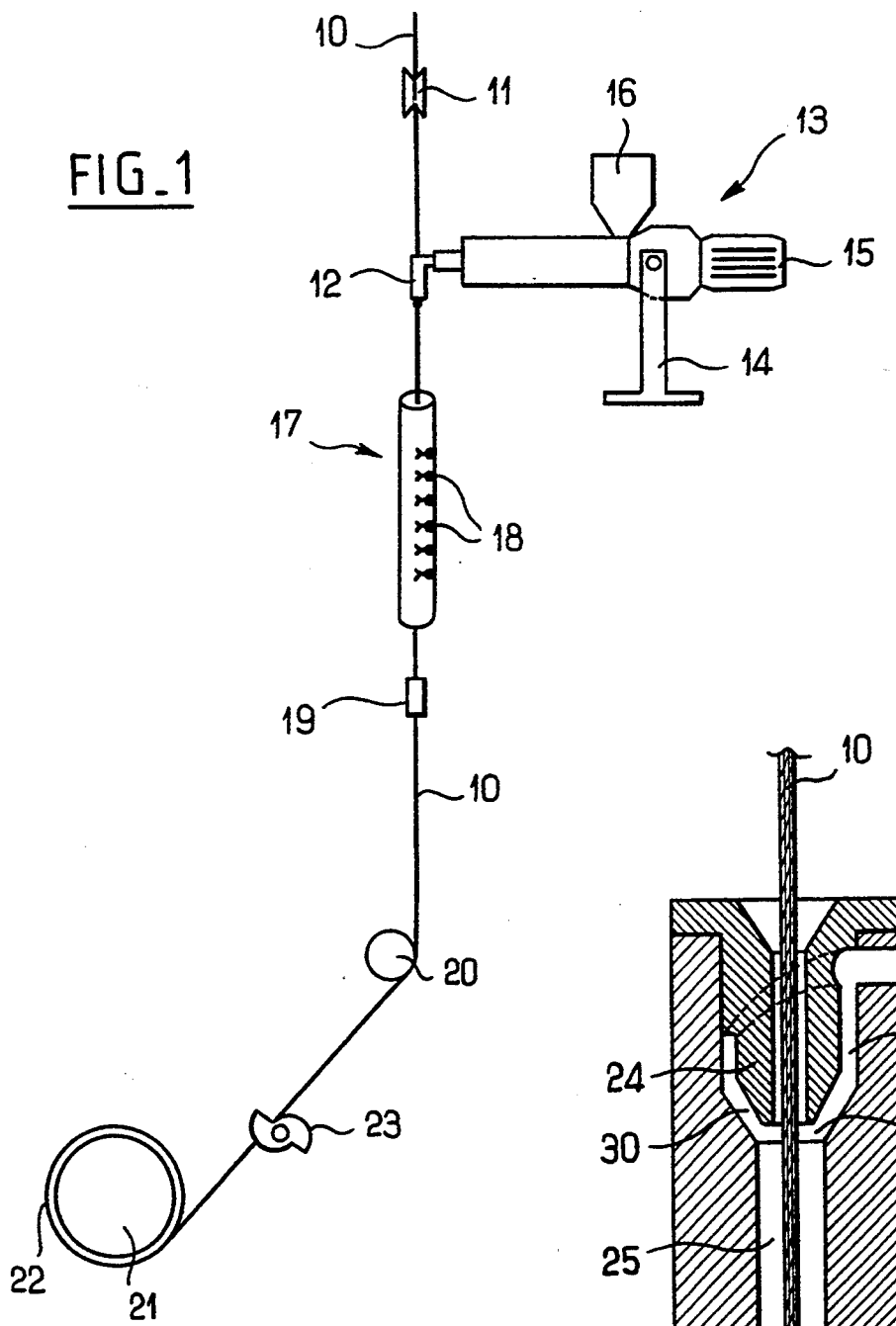
FIG_1
FIG_2

PROCESS FOR THE MANUFACTURE OF A COMPOSITE THREAD AND COMPOSITE PRODUCTS OBTAINED FROM SAID THREAD

The present invention relates to the manufacture of a composite thread formed by the combination of a plurality of filaments sheathed with a thermoplastic organic material.

More particularly the present invention relates to the manufacture of a composite thread formed of filaments used as reinforcement, such as glass filaments, and filaments of a thermoplastic organic material, the said thread being coated, or even impregnated to its core, by a thermoplastic organic material.

Composite products formed by the combination of reinforcing threads and a thermoplastic organic material are preferably manufactured using composite materials in which the reinforcement and the organic material have already been combined. This is the case in particular of parts obtained as a result of being wound on a rotating mandrel or of flexible composite products obtained by weaving for example.

Numerous means of associating reinforcing threads and a thermoplastic organic material already exist. These means can be divided into two broad categories: those which seek to coat each filament constituting a thread by immersion in a bath of molten organic material for example and those which seek to coat a thread formed of a plurality of filaments.

Patent EP-B-133 825 for example can be cited from the prior art describing these means. This document describes a composite material formed of a roving of reinforcing filaments coated with a fine thermoplastic resin powder, the said roving being sheathed with a thermoplastic material of which the melting point is less than or equal to that of the coating powder. This roving, inside which the grains of powder are free to move between the filaments, is characterised by its flexibility. Owing to this quality, a roving of this type can lend itself to braiding or weaving operations. However, this roving cannot be cut into sections since it would then lose a large part of the thermoplastic powder it contains.

The process used to manufacture a roving of this type consists in extracting a continuous roving from a roll, charging it electrostatically such that the filaments constituting it are separated, passing it in this state through a fluidised bed of resin powder particles, reforming the roving by joining the powder-coated filaments and then sheathing it in a layer of thermoplastic organic material. This covering can be obtained in different ways, in particular by extrusion. In this embodiment, the powder-charged roving passes into a die plate mounted in the manner of a cross head of the electrical or telephone wire covering head type. The principle of the process used restricts the speed at which the roving advances which, according to the example cited, is of the order of 1 to 2 m per second.

Patent application EP-A-33 244 describes a further composite material and the process for obtaining it. This document describes in particular a composite roving formed by the combination of continuous reinforcing threads and continuous threads of a thermoplastic organic material, the said roving then being sheathed with a thermoplastic organic material. This roving is obtained according to a process consisting in sourcing the reinforcing threads and the organic material threads from separate rolls and assembling them to form a single roving at the inlet of a heating device of which the function is to soften the organic material threads sufficiently such that all the threads adhere to one another. The roving consolidated in this manner passes into a second device, known per se, which coats it with a layer of thermoplastic organic material.

Although no example is given, it is highly likely that the process used does not permit high advance velocities to be achieved. The simple heating of the organic threads, intended to impart cohesion to the roving, doubtless does not enable these velocities of advance to exceed the order of 1 m per second. In addition, the adhesion of the threads to one another imparts a certain degree of stiffness to the roving.

Patent application EP-A-393 536 describes a thread formed of a plurality of filaments and covered with thermoplastic resin; some of these filaments are separated from one another and are surrounded with resin and the others remain assembled together in the form of bundles.

This product is obtained as result of a thread being passed through a die plate mounted in the manner of a cross head at the end of an extruder inside which it is brought into contact with a pressurised thermoplastic resin. The injection of resin at right angles to the path of the thread from an aperture connecting the wall of the central chamber of the die plate to the extruder causes the thread to break up and a given number of the filaments to separate from one another. The effect of the pressure exerted preferentially from one side only of the thread is likewise to cause an irregular distribution of the reinforcement within the molten resin.

Prior to impregnation of the thread, the process used requires the thread to be heat treated in order to eliminate material deposited on the surface of the filaments which is likely to decompose at low temperature. Although no actual value is given, it is probable that this process does not permit velocities of advance of the order of 1 m per second to be exceeded.

The object of the present invention is a process for manufacturing a thread which is coated with a thermoplastic organic material and enables the limitations of the prior art with respect to the velocity of advance during the coating operation to be exceeded.

In particular the object of the present invention is a process enabling the entire range of products to be obtained, from flexible composite threads coated simply with a thin superficial coating of thermoplastic organic material to composite threads at least partially impregnated with thermoplastic organic material.

Further aspects of the invention relate to composite threads of which the core, formed by a bundle of filaments of at least two different materials, is coated with a thermoplastic organic material, and composite parts produced from threads obtained according to the invention.

The objects of the invention are achieved by means of a process for manufacturing a composite thread formed of a plurality of filaments combined with a thermoplastic organic material, according to which process the said thread is carried mechanically along the axis of the central duct of a device mounted in the manner of a cross head at the end of an extruder, the thread being brought into contact with the molten, pressurised organic material in the said duct, and which consists in injecting the organic material into the duct towards the thread and concentrically thereto, and, as soon as it comes into contact with the material, exerting on the said thread a constant maximum radial pressure over at least part of its path through the said duct, the said pressure in the duct remaining less than 50 bars.

Depending on the intended application, the filaments may be glass or carbon filaments, or aramid filaments known, for example, by the trade mark KEVLAR.

The initial thread can thus be a mixed thread formed by the combination of different types of threads, extracted from different rolls, immediately before the thread is introduced into the die plate, or from a previously manufactured single roll of mixed thread.

The mixed thread which can be used within the scope of the invention can also be obtained as a result of an organic thread extracted from a roll and glass filaments in the process of being drawn being combined for example or, conversely, a glass thread extracted from a roll and organic filaments in the process of being drawn being combined.

The implementation of the invention during the course of a direct process is even more advantageous. In effect, the coating of a thread can be performed during its manufacturing process. Thus, for example, a plurality of known filaments, formed by the mechanical drawing of thin molten glass threads from a die plate, are assembled to form a thread which is directly coated with a material at the velocity at which the filaments constituting it are drawn. Likewise, a mixed thread obtained according to the process described in EP-A-367 661 can also be coated directly. In one of the embodiments described in this document, the mixed thread is formed by the combination of glass filaments, from a die plate supplied with molten glass, and organic filaments from an extruder head supplied with thermoplastic organic material.

The application of the invention during the course of a direct process is doubly advantageous in so far as it avoids the manufacture and storage of rolls of thread prior to the coating operation, and in so far as the length of coated thread produced per unit of time may be more than ten times greater than that achieved by the known processes.

The process according to the invention enables shearing of the organic material coming into contact with a thread carried along at high velocity to be considerably reduced and the thread prevented from being subjected to stresses which are too high and likely to cause some of the filaments constituting the thread to rupture. The shearing forces are reduced as a result of the organic material being injected into the central duct such that the flow of material injected is directed toward the outlet of the device. As soon as it is injected into the central duct, the organic material is thus spread in a direction similar to that followed by the moving thread. The difference in velocity between the organic material and the thread is thus considerably reduced. This difference is preferably reduced as soon as the thread comes into contact with the organic material. It is for this reason that the material is preferably injected at the very inlet of the central duct of the device.

In accordance with the invention, the material is injected such that the flow of material moves towards the duct outlet at an average velocity of at least 0.5 times the velocity at which the thread moves. This can be achieved by injecting the material at a relatively low pressure of less than 50 bars and preferably of less than 30 bars.

Thus, when the velocity at which the thread advances increases, a sufficiently slight difference in velocity, ensuring that the thread is uniformly coated, can be maintained as a result of the pressure of the material injected being slightly increased.

The process according to the invention thus enables the thread to be passed into the device at velocities of more than 5 m per second without impairing the uniformity of the coating of the said thread and the quality of its impregnation.

By means of the process according to the invention the molten organic material exerts uniform radial pressure on the surface of the thread as soon as it comes into contact therewith. The thread, subjected to a range of balanced pressures as it passes through the device, tends not to break up.

Furthermore, the pressure exerted by the material should be at its maximum value as soon as it comes into contact with the thread. Since the thread is practically cold when it arrives in the device, the viscosity of the material increases when it comes into contact therewith. If the thread is initially subjected to a relatively low pressure, a layer of viscous material forms on its surface and prevents its being impregnated even if a higher pressure is subsequently exerted thereon.

In addition, with a central duct of which the cross-section is constant over at least part of its length, a constant maximum radial pressure can be maintained on the thread over at least part of its path through this duct, which improves the quality of impregnation of the resultant thread.

As a result of the pressure and/or viscosity of the organic material and the velocity at which the thread passes through the device being regulated, the thickness of the area within the thread penetrated by the material can be controlled for a given organic material. A thread is thus obtained of which the central part is formed of a bundle of filaments not impregnated with organic material and is surrounded on its periphery by an area impregnated with material, the entire assembly being coated with a layer of which the thickness is regulated at the outlet of the device by means of a calibrating aperture.

The thickness of the impregnated area of the thread also depends on the degree of chemical compatibility which is likely to exist between the molten organic material and the filaments constituting the thread. If the level of compatibility is high, the filaments are easily wetted by the organic material which can penetrate the thread. Conversely, if the filaments and organic material are only slightly chemically compatible, the thread emerges from the die plate coated with a simple layer deposited on its surface.

At the outlet of the device, this layer of material which is still hot is adhesive. If the velocity at which the thread advances is high, at least the surface area of this layer must be cooled before the thread comes into contact with any device.

This cooling effect has to be even more powerful, the higher the velocity of the thread. The cooling effect is brought about by passing the thread through an area within which it is subjected to the action of a gaseous or liquid fluid. Cooling is achieved most rapidly as a result of droplets of water being sprayed onto the thread as it passes through.

In accordance with one embodiment of the invention, a continuous rotational movement is imparted to the thread as it moves, thus causing it to twist.

This rotational movement can be brought about by means of devices of the type described in EP-A-273 812: for example two continuous belts or a nozzle directing a jet of air at very high pressure tangentially to the thread.

This device is installed downstream of the cooling area. When the thread is cooled as a result of water being sprayed onto it, the air jet device enables the water remaining on the surface of the said thread after it has passed through the cooling area to be eliminated.

The rotational movement is imparted to the thread such that the torsion originates upstream of the device inlet. Thus the thread having a single twist is coated with organic material which, after cooling, enables the said torsion to be fixed.

The threads obtained according to the invention have a core formed of a bundle of filaments of which at least some are able to move relative to one another, surrounded with organic material. The flexibility of these threads, resulting from the mobility of the filaments in their core, and their protection by an organic material covering results in a high quality material for producing composite parts as a result of being wound onto a support or pultrusion or for manufacturing fabrics or warp knit products to be used for reinforcing organic or mineral materials.

The threads obtained according to the invention can be cut and are advantageously used in this form during the course of a process for manufacturing composite parts by extrusion. The coating of thermoplastic material which covers them protects the core filaments during the mixing process to which they are subjected in the extruder.

The invention will be better understood from the following detailed description of one embodiment given by way of example, illustrated by the following Figures, in which:

FIG. 1 shows schematically a partial side view of an example of an installation for implementing the invention; and FIG. 2 shows schematically a longitudinal view in section of the device used within the installation in FIG. 1.

In accordance with FIG. 1, a mixed thread 10, formed of an assembly of continuous reinforcing filaments and thermoplastic organic material, is guided by a member 11. The function of this member is to bring the thread 10 into the axis of the device 12 mounted in the manner of a cross head and vertically at the end of the extruder 13. This extruder, which is integral with the mounting 14, is provided with a lifting screw rotated by the motor 15. The extruder 13 is supplied with thermoplastic organic material in the form of granules by means of the hopper 16. This extruder enables the organic material to be injected in the molten state into the device 12 at high pressure which may reach 50 bars.

A device 17 for cooling the thread can be installed downstream of the device 12. The device shown consists of a cylinder 18 of which the axis coincides with that of the device 12 and which is provided with a series of nozzles for spraying water into the said cylinder.

A device, shown symbolically at 19, for twisting the thread 10 can be disposed downstream of the device 17 and on the axis thereof. This device may be of the type described in the article "L'Industrie Textile - No. 1166 - 5/86 - 485-492", operating on the principle of torsion imparted by a jet of air.

if the velocity at which the thread 10 passes through is low, the device 19 can be disposed directly downstream of the device 12.

The device 19 is adjusted such that the torsion of the thread 10 increases upstream of the device 12.

The thread 10, coated with a layer of organic material which is solidified at least on the surface, passes over a guide member 20 before being wound onto a spindle 21 rotated by a motor mounted on a stand (not illustrated). The thread 10 is wound in the form of a roll 22 by means of a distribution member 23.

Instead of being carried along by a rotating spindle, the thread 10 may be carried along by a fibre-drawing wheel and distributed on a conveyor, in accordance with the processes and devices described in U.S. Pat. Nos. 3,467,739 and 3,676,095 for example.

The thread 10 can also be carried along by a cutting machine as provided for example in U.S. Pat. No. 4,406,196. In this latter case the thread has preferably been subjected to torsion which is fixed as the organic material cools, this structure preventing the thread being crushed between the wheels of the cutting machine in the manner of an ordinary thread.

The method of impregnation and coating of the thread 10 with a molten thermoplastic organic material is illustrated in FIG. 2. The longitudinal view in section of the device 12 shows that the latter comprises a hollow punch 24, a central duct 25 and an area 26 in which the thread passage cross-section is reduced.

The device 12 is connected to the extruder by means of the feed duct 27. Inside the device 12, this duct opens out into a chamber 28 surrounding the punch 24. This chamber terminates in the form of an annular aperture 29 at the top of the central duct 25.

The essential function of the punch 24 is to guide the thread 10 and centre it perfectly. The chamber 28 matches the outer shape of the punch 24, in particular its lower frustoconical area 30, which converges towards the thread 10 as it enters the central duct.

By means of this specific internal structure, when the thread comes into contact with the organic material, the latter exerts uniform pressure on the entire periphery of the said thread as soon as contact is established. As a result, since all the filaments constituting the thread are subjected to the same pressure, they preserve their cohesion.

The area 26, formed by a frustoconical area 31 having a passage with a constant cross-section 32, enables the organic material to be maintained under pressure in the central duct. The passage 32 enables the diameter of the thread coated with material to be calibrated. At the outlet of the device 12, the resultant thread comprises a core 33 formed of the bundle of filaments constituting the thread 10 and coated on its periphery with a uniform layer 34 of organic material.

EXAMPLE 1

A mixed thread, formed of 800 filaments of glass E of an average diameter of 14 microns and 750 filaments of polypropylene homopolymer (flow figure 20 dg/min, measured in accordance with ISO 1133 standard) of an average diameter of 25 microns and intimately mixed, is coated under the following conditions:

single screw extruder:

screw diameter: 25 mm — L/D = 30

-continued

| | |
|---|---|
| maximum flow rate: | 10 kg/h | the device disposed in the manner of a cross head at the end of the extruder corresponds to that shown in FIG. 2:

| | |
|---|---|
| diameter of punch passage (24): | 0.95 mm |
| diameter of central duct (25): | 2.00 mm |
| diameter of calibrating aperture (32): | 1.10 mm | the device is supplied with molten material formed from the following mixture:

| | |
|---|---|
| 35% of hydrogenated hydrocarbon resin: | |
| ball/ring softening point: | 97–103° C. |
| Brookfield viscosity: | 150 mPa.s at 180° C. |
| 65% polypropylene wax: | |
| ball/ring softening point: | 163° C. |
| Brookfield viscosity: | 600 mPa.s at 190° C. |
| temperature of device: | 230° C. |
| pressure inside device: | 10 to 15 bars |
| thread velocity: | 10 m.s$^{-1}$ |

The thread passes through the axis of a cylinder which is approximately 1 m long and is provided with a series of nozzles from which water is sprayed onto the thread as it passes through.

A size in the aqueous phase is deposited onto the glass filaments; this size substantially consists of an amine silane and a coupling agent of the modified maleic anhydride polypropylene type.

The resultant thread is simply covered; the amount of material deposited onto its surface expressed as a weight percentage relative to the initial titre of the thread is 20%.

EXAMPLE 2

A mixed thread consisting of 800 filaments of glass E of an average diameter of 14 microns and 800 filaments of polypropylene homopolymer (flow figure 35 dg/min) of an average diameter of 26 microns is coated in the following conditions:

the extruder is identical to the one used in the previous example. The device mounted in the manner of a cross head similar to the preceding one has the following features:

| | |
|---|---|
| diameter of punch passage (24): | 1.4 mm |
| diameter of central duct (25): | 2.0 mm |
| diameter of calibrating aperture (32): | 1.2 mm | the device is supplied with polypropylene homopolymer (fluid figure 35 dg/min) in the following conditions:

| | |
|---|---|
| temperature of device: | 260° C. |
| pressure inside device: | 6 bars |
| thread velocity: | 17 m.s$^{-1}$ | the size deposited on the glass filaments is identical to that used in the preceding example and the mixed thread, once covered, is cooled under the same conditions.

EXAMPLE 3

The mixed thread used and the coating conditions are the same as in Example 1 apart from the following differences:

the organic filaments are obtained by extrusion of a mixture of polypropylene homopolymer (flow figure 20 dg/min) and a polypropylene modified chemically by maleic anhydride grafting. The effect of the latter constituent is to increase the polarity of the organic filaments.

The glass filaments are sized with a size in the non-aqueous phase. This size essentially comprises an epoxy cyclo aliphatic resin, a vinyl ether and an amine silane.

The mixture injected into the die plate comprises the same constituents in proportions of 30% resin and 50% wax, to which there is added 20% polypropylene modified chemically by maleic anhydride grafting.

The polypropylene has the following characteristics:

| | |
|---|---|
| ball/ring softening point: | 157° C. |
| Brookfield viscosity: | 275 mPa.s at 190° C. |

The conditions in which the thread is coated are the same as above.

The resultant thread has a core formed by the bundle of filaments of which the outer area is impregnated with organic material, the entire assembly being coated with a layer of the said material.

The amount of organic material deposited on the mixed thread, expressed as a weight percentage relative to the titre of the thread, is 20%.

The composite threads according to the invention enable different composite products to be produced directly as illustrated in the following examples.

EXAMPLE 4

The composite thread from Example 3 is used to produce a fabric in the following conditions: a warp of 2.6 threads per centimeter is prepared on a rapier weaving frame which is 1.27 meters wide. A plain-weave fabric with a weft set density of 2.2 threads per centimeter is produced at an insertion velocity of 100 strokes per minute.

The resultant fabric (390 g/m$^2$) has a high degree of strength and is sufficiently deformable to be applied to a thermoforming mould used to produce composite parts.

EXAMPLE 5

The composite thread from Example 3 is disposed as the warp with a gauge of 2.35 threads per centimeter on a knitting frame, with the weft knitted into the warp. The connection thread is a 55 Tex polypropylene thread.

This same polypropylene thread is woven as weft in order to produce a flat structure of 205 g/m$^2$.

This structure can be used to obtain unidirectional reinforcement within a thermoformed part.

EXAMPLE 6

55 bobbins of composite thread, identical to that of Example 3, are disposed on creels upstream of a thermoplastic pultrusion line. This line comprises a tunnel for preheating by radiation, a die plate with a converging profile having a rectangular cross-section maintained at 240° C., a cooling fixture of which the temperature is likewise regulated, and a strip drawing device. A profiled part 15 mm×3 mm and comprising 42% by weight of strengthener is continuously produced.

This profiled part can either be used as a semifinished product for producing complex composite parts or can be used in civil engineering constructions (prestressing tie rods or bracing wires for example).

EXAMPLE 7

A sheet of 4 composite threads, identical to that described in Example 3, is wound by a planetary movement onto a detachable mandrel. A vessel formed of polypropylene reinforced with 42 weight % glass is continuously produced. The chemical inertia of the polypropylene enables this vessel to be used for storing and transporting chemical products.

We claim:

1. Process for manufacturing a composite thread formed of a plurality of filaments combined with a thermoplastic organic material, according to which an initial thread formed of of a plurality of filaments is drawn mechanically along the axis of a central duct of a device mounted in the manner of a cross head at the end of an extruder, said duct having an inlet and an outlet, the initial thread being brought into contact with a molten organic material which is under pressure in said duct, characterized by the steps of:
   a) injecting the organic material into the duct towards the initial thread and concentrically thereto;
   b) thereafter moving the organic material along the axis of the central duct without any movement in a circumferential direction relative to said axis;
   c) moving said initial thread into contact with said organic material at a contact point where the organic material is moving along the axis of the central duct;
   d) subjecting said initial thread at said contact point to a constant and uniform maximum radial pressure less than 50 bars;
   e) maintaining said constant and uniform pressure over the path of movement of said initial thread through said duct, said pressure in the duct remaining less than 50 bars; and
   f) moving the initial thread and said organic material together along said axis of the central duct from said contact point to said outlet of said duct.

2. Process according to claim 1, characterised in that the organic material is injected into the central duct of the device such that this flow of material injected is directed towards the outlet of the said duct.

3. Process according to claim 1, characterised in that the organic material is injected such that the flow of said material moves at an average velocity which is at least 0.5 times the velocity at which the initial thread moves.

4. Process according to claim 3, characterised in that the initial thread is carried along at a velocity of at least 5 meters per second.

5. Process according to claim 1, characterised in that, for a given organic material having a thickness of penetration area inside the initial thread, said thickness is controlled as a result of controlling the pressure and/or viscosity of said material arriving in the central duct of the device and/or the velocity at which the initial thread passes through the device being adjusted.

6. Process according to claim 1, characterised in that the composite thread coated with thermoplastic organic material is cooled downstream of the device by passing it through an area in which it is subjected to the action of a gaseous or liquid fluid.

7. Process according to claim 6, characterised in that the composite thread is cooled as a result of droplets of water being sprayed onto it as it passes through the duct.

8. Process according to claim 1, characterised in that a continuous rotational movement and torsional force is imparted to the initial thread as it moves.

9. Process according to claim 8, characterised in that the rotational movement is imparted to the initial thread such that the torsion thereof originates upstream of the device.

10. Composite thread obtained according to the process defined in claim 1, characterised in that it is formed of a core comprising filaments of a material used as reinforcement, the said core being coated with a layer of thermoplastic organic material and at least partially impregnated with the said material.

11. Composite thread according to claim 10, characterised in that the core of said composite thread is formed of filaments grouped together to form a single bundle, at least one of the filaments remaining free to move relative to one another.

12. Composite thread according to claim 11, characterised in that its core is formed of a bundle of filaments comprising a twist.

13. Composite thread according to claim 10, characterised in that the core of the initial thread consists of filaments of a material used as reinforcement and filaments of a thermoplastic organic material.

14. Composite thread according to claim 13, characterised in that the initial thread is formed of continuous glass filaments combined with filaments formed of a material selected from the group comprising organic materials which can be transformed into continuous filaments, such as polypropylenes, polyamides and polyesters.

15. Composite part comprising a composite thread wound on a support, said thread being formed of a core comprising filaments of a material used as reinforcement, said core being coated with a layer of thermoplastic organic material and at least partially impregnated with said material.

16. Fabric or knitting warp having a weft and/or warp formed by a composite thread, said thread being formed of a core comprising filaments of a material used as reinforcement, said core being coated with a layer of thermoplastic organic material and at least partially impregnated with said material.

17. Composite profiled part obtained by pultrusion from a plurality of reinforcing threads, characterised in that at least some of the threads used are composite threads, formed of a core comprising filaments of a material used as reinforcement, the said core being coated with a layer of thermoplastic organic material and at least partially impregnated with the said material.

18. Process for manufacturing a composite thread of predetermined diameter formed of a plurality of filaments combined with a thermoplastic organic material, according to which an initial thread formed of a plurality of filaments is drawn mechanically along the axis of a central duct of a device mounted in the manner of a cross head at the end of an extruder, said duct having an inlet and an outlet, said outlet having a tapered entrance and an outlet diameter equal to said predetermined diameter, the initial thread being brought into contact with a molten organic material which is under pressure in said duct, characterised by the steps of:

a) injecting the organic material into the duct towards the initial thread and concentrically thereto;

b) thereafter moving the organic material along the axis of the central duct;

c) moving said initial thread into contact with said organic material at a contact point where the organic material is moving along the axis of the central duct;

d) subjecting said initial thread at said contact point to a constant maximum radial pressure less than 50 bars e) maintaining said pressure over at least part of the path of movement of said initial thread through said duct; and f) moving the initial thread and said organic material together along said axis of the central duct from said contact point to said outlet of said duct with a constant thickness of said organic material surrounding said initial thread for the entire distance between said contact point and said entrance to said outlet to define an organic coated initial thread of a uniform diameter which is greater than said predetermined diameter of said composite thread as it exits from said outlet of said duct.

* * * * *